United States Patent [19]

Weiss

[11] Patent Number: 4,885,778

[45] Date of Patent: Dec. 5, 1989

[54] METHOD AND APPARATUS FOR SYNCHRONIZING GENERATION OF SEPARATE, FREE RUNNING, TIME DEPENDENT EQUIPMENT

[76] Inventor: Kenneth P. Weiss, 15 Dwight St., Boston, Mass. 02109

[21] Appl. No.: 802,579

[22] Filed: Nov. 27, 1985

Related U.S. Application Data

[63] Continuation-in-part of Ser. No. 676,626, Nov. 30, 1984, Pat. No. 4,720,860.

[51] Int. Cl.$^4$ .............................................. H04L 9/00
[52] U.S. Cl. ...................................... 380/48; 380/23; 380/25; 380/28; 235/382; 340/825.31; 340/825.34
[58] Field of Search ................... 364/200, 900, 571; 235/382, 380; 375/110; 370/104, 103; 368/46, 47; 380/23–25, 28, 48; 178/22.08, 22.09, 22.17; 340/825.31, 825.34

[56] References Cited

U.S. PATENT DOCUMENTS

| | | | |
|---|---|---|---|
| 3,764,742 | 10/1973 | Abbott et al. ........................ | 380/23 |
| 3,789,653 | 2/1974 | Brejand ............................... | 368/47 |
| 3,806,874 | 4/1974 | Ehrat ................................ | 178/22.08 |
| 3,886,451 | 5/1975 | Chu et al. ........................... | 364/571 |
| 3,900,867 | 8/1975 | Wagner ............................... | 342/45 |
| 3,995,111 | 11/1976 | Tsuji et al. ........................ | 370/104 |
| 4,104,694 | 8/1978 | Hargrove .......................... | 340/825.31 |
| 4,126,761 | 11/1978 | Groupe et al. ...................... | 380/48 |
| 4,145,568 | 3/1979 | Ehrat ................................ | 178/22.17 |
| 4,145,569 | 3/1979 | Ehrat ................................ | 178/22.17 |
| 4,185,166 | 1/1980 | Kinch, Jr. et al. .................. | 380/43 |
| 4,193,073 | 3/1980 | Kohnen .............................. | 342/56 |
| 4,320,387 | 3/1982 | Powell ............................ | 340/825.34 |
| 4,326,098 | 4/1982 | Bouricius et al. ................... | 380/25 |
| 4,494,211 | 1/1985 | Schwartz ............................ | 368/47 |
| 4,543,657 | 9/1985 | Wilkinson ........................... | 375/1 |
| 4,582,434 | 4/1986 | Plangger et al. ..................... | 368/47 |
| 4,589,066 | 5/1986 | Lam et al. .......................... | 364/200 |
| 4,599,489 | 7/1986 | Cargile .............................. | 380/4 |
| 4,609,777 | 9/1986 | Cargile .............................. | 380/4 |
| 4,636,583 | 1/1987 | Bidell et al. ....................... | 380/48 |
| 4,641,322 | 2/1987 | Hasegawa ............................ | 375/1 |
| 4,677,617 | 6/1987 | O'Connor et al. .................. | 375/1 X |
| 4,720,860 | 1/1988 | Weiss ................................ | 380/23 |

FOREIGN PATENT DOCUMENTS 0010496 4/1980 European Pat. Off. .
0140013 5/1985 European Pat. Off. .

OTHER PUBLICATIONS

*IBM Tech. Discl. Bull.;* (vol. 26; No. 7A; 12/83; pp. 3292-3293).
*IBM Tech. Discl. Bull.;* (vol. 28; No. 7A; 12/83; pp. 3286-3288).

Primary Examiner—Stephen C. Buczinski
Assistant Examiner—Bernarr Earl Gregory
Attorney, Agent, or Firm—M. Lawrence Oliverio

[57] ABSTRACT

An apparatus and method for synchronizing the time definition of the dynamic variables by (a) calculating a first non-predictable code according to a secret predetermined algorithm, the algorithm generating the first non-predictable code on the basis of a first dynamic variable and a unique static variable; (b) automatically defining the first dynamic according to a first interval in which the static variable is input into the algorithm, the first interval of time having a predetermined duration; (c) calculating two or more second non-predictable codes according to the predetermined algorithm, the algorithm generating the second non-predictable codes on the basis of the two or more second dynamic variables and the unique static variable, (d) automatically defining the two or more second dynamic variables according to two or more cells of a second interval of time in which the static variable is input into the algorithm of the second computer, the second interval of time comprising a central cell of time having a predetermined duration and one or more cells of time bordering the central cell of time, each bordering cell of time having a predetermined duration; (e) comparing the first non-predictable code with the second non-predictable codes to determine a match, and (f) automatically synchronizing the clock mechanisms which define the first and second dynamic variables upon comparison and matching of the first non-predictable code with one of the second non-predictable codes.

26 Claims, 5 Drawing Sheets

METHOD AND APPARATUS FOR SYNCHRONIZING GENERATION OF SEPARATE, FREE RUNNING, TIME DEPENDENT EQUIPMENT

CROSS-REFERENCE TO OTHER APPLICATION(S)

This is a continuation-in-part of U.S. Ser. No. 676,626 filed Nov. 30, 1984, Applicant: Kenneth Weiss, now U.S. Pat. No. 4,720,860, issued Jan. 19, 1988.

BACKGROUND OF THE INVENTION

The present invention relates to an apparatus and method for the electronic generation of variable, non-predictable codes and the validation and comparison of such codes for the purpose of positively identifying an authorized individual or user of an apparatus or system and thereafter giving clearance to carry out a privileged transaction or access to a protected system or facility.

There often arises a need to prevent all but selected authorized persons from being able to carry out some defined transaction (such as granting of credit) or to gain access to electronic equipment or other system, facility or data (hereinafter "clearance or access"). Prior methods for preventing unauthorized clearance or access typically involve devices which limit access to the subject data, facility, or transaction to those who possess a unique physical device, such as a key or who know a fixed or predictable (hereinafter "fixed") secret code. The problem inherent in relying on a fixed code or unique physical device as the means to gain such selective clearance or access is that would-be unauthorized users need only obtain possession of the fixed code or unique device to gain such clearance or access. Typical instances of fixed codes include card numbers, user numbers or passwords issued to customers of computer data retrieval services.

The principal object of the invention is to synchronize the generation of time-dependent non-predictable codes which are independently generated on the basis of date and time information which are generated on separate devices which over time may deviate out of time synchrony with each other. A further object of the invention is to provide a practical approach to generating identification codes which are unique to the user and which change periodically without user intervention but which provide a readily verifiable means of identification for providing clearance or access at any time.

SUMMARY OF THE INVENTION

The present invention eliminates the relatively easy access afforded to someone who copies or otherwise misappropriates a secret "fixed" code by periodically generating identification codes by using fixed codes, variable data, and a predetermined algorithm which is unknown in advance and unknowable outside the administration of the security system even to authorized users of the apparatus utilizing the fixed secret code. The predetermined algorithm constantly generates new unique and verifiable non-predictable codes, which are derived from the fixed data and at least one dynamic variable, such as the time of day (including the date) by the predetermined algorithm. The constant changes in the dynamic variables when processed by the algorithm results in the generation of constantly changing non-predictable codes.

In accordance with the invention, in a system for comparing and matching non-predictable codes generated by separate computers on the basis of dynamic variables defined by separate clock mechanisms according to time, there is provided an apparatus for synchronizing the time definition of the dynamic variables comprising: a first computer for calculating a first non-predictable code according to a predetermined algorithm, the algorithm generating the first non-predictable code on the basis of a first dynamic variable and a unique static variable; a first clock mechanism for automatically defining the first dynamic variable according to a first interval of time in which the static variable is input into the algorithm, the first interval of time having a first predetermined duration; a second computer for calculating two or more second non-predictable codes according to the predetermined algorithm, the algorithm generating the second non-predictable codes on the basis of the two or more second dynamic variables and the unique static variable; a second clock mechanism for automatically defining the two or more second dynamic variables according to two or more cells of a second interval of time in which the static variable is input into the algorithm of the second computer, the second interval of time comprising a central cell of time having a predetermined duration and one or more cells of time bordering the central cell of time, each bordering cell of time having a predetermined duration; a mechanism for comparing the first non-predictable code with the second non-predictable codes to determine a match; and, a mechanism for automatically synchronizing the first clock mechanism and the second clock mechanism upon comparison and matching of the first non-predictable code with one of the second non-predictable codes.

The central cell of time typically comprises the date and the minute in which the unique static variable is input into the second computer as defined by the second clock mechanism; and the bordering cells of time may comprise a cell of time comprising the date and the minute immediately preceding the central cell.

Preferably the mechanism for synchronizing comprises: a counting mechanism for counting the difference in time between a central cell of time and a bordering cell of time from which a matching second non-predictable code may be generated; a summing mechanism connected to the counting mechanism for summing successive differences in time counted by the counting mechanism; a storage mechanism connected to the summing mechanism for storing the output of the summing mechanism; and, a shifting mechanism connected to the storage mechanism for shifting a central cell and bordering cells of time by the output of the summing mechanism stored in the storage mechanism.

The bordering cells of time may comprise a selected number of cells of time immediately preceding the central cell and a selected number of cells of time immediately following the central cell; and the central and bordering cells of time are typically selected to be one minute in duration.

Preferably, the mechanism for synchronizing further comprises: a second storage mechanism connected to the comparison mechanism for storing the date of the most recent comparison and matching by the comparison mechanism; a second counting mechanism connected to the second storage mechanism for counting the difference in time between the date stored and the date of present entry into the second computer; a dividing mechanism connected to the second counting mechanism for dividing the difference in time counted by the second counting mechanism by a selected value and prescribing the output as a first window opening number; a window opening mechanism connected to the dividing mechanism and the comparison mechanism for calculating as many extra second non-predictable codes on the basis of as many extra bordering cells of time immediately preceding and following the selected number of bordering cells as prescribed by the first window opening number.

Most preferably, the mechanism for synchronizing further comprises: a sensing mechanism connected to the second clock mechanism for sensing a re-setting of the second clock mechanism; a third storage mechanism connected to the sensing mechanism prescribing and storing the occurrence of a sensed re-setting of the second clock mechanism as a selected second window opening number; and, a second window opening mechanism connected to the third storage mechanism for calculating as many additional second non-predictable codes on the basis of an many additional bordering cells of time immediately preceding and following the extra bordering cells of time as prescribed by the second window opening number.

The first computer typically comprises a microprocessor wherein the algorithm is stored in volatile dynamic memory encapsulated with an energizing mechanism which when interrupted destroys all data including at least the algorithm and the static variable.

Most preferably, the algorithm of the second computer is stored in volatile dynamic memory encapsulated with an energizing mechanism which when interrupted destroys all data including at least the algorithm and the static variable.

In a method for comparing non-predictable codes generated by separate computers on the basis of dynamic variables defined by separate clock mechanisms according to time wherein the codes match when the dynamic variables match, there is also provided a method for synchronizing the time definition of the dynamic variables comprising the steps of: inputting a static variable into a first computer including a predetermined algorithm; employing the algorithm of the first computer to calculate a first non-predictable code on the basis of the static variable and a first dynamic variable defined by a first interval of time in which the step of inputting occurred according to a first clock mechanism; putting the static variable and the first non-predictable code into a second computer independently including the predetermined algorithm; using the algorithm of the second computer to independently calculate two or more second non-predictable codes on the basis of the static variable and two or more second dynamic variables defined by two or more cells of a second interval of time in which the step of putting occurred according to a second clock mechanism, the second interval of time comprising a central cell of time and one or more bordering cells of time; comparing the first non-predictable code with the second non-predictable codes to determine a match; and, synchronizing the first clock mechanism and the second clock mechanism upon comparison and matching of the first non-predictable code with one of the second non-predictable codes.

The step of synchronizing preferably comprises the steps of: counting the difference in time between a central cell of time and a bordering cell of time from which a matching second non-predictable code may be generated; summing successive differences in time counted during the step of counting; storing the summed successive differences in time; and, shifting the central and bordering cells of time by the summed successive differences in time.

Most preferably, the step of synchronizing further comprises the steps of: storing the date of the most recent comparison and determination of a match; counting the difference in time between the date stored and the date of present entry into the second computer; dividing the difference in dates counted by a selected value and prescribing the output as a first window opening number; and, calculating as many extra second non-predictable codes on the basis of as many extra bordering cells of time immediately preceding and following the selected number of bordering cells as prescribed by the first window opening number.

Most preferably, the step of synchronizing further comprises the steps of: sensing a re-setting of the second clock mechanism; prescribing and storing the occurrence of a sensed re-setting of the second clock mechanism as a second selected window opening number; and, calculating as many additional second non-predictable codes on the basis of as many additional bordering cells of time immediately preceding and following the extra bordering cells of time as prescribed by the second window opening number.

The volatile dynamic memory included in either or both of the first computer, the access control means, the host computer and the means for comparing preferably stores and maintains all programs such as the predetermined algorithm, system operating programs, code comparison and matching programs, and the like; and the volatile dynamic memory further preferably stores, maintains and makes available for use all data and results of operations such as fixed codes, resultant codes, dynamic variables and the like.

BRIEF DESCRIPTION OF THE DRAWINGS

Other objects, features and advantages will be apparent from the following detailed description of preferred embodiments thereof taken in conjunction with the accompanying drawings in which.

DETAILED DESCRIPTION OF THE INVENTION

Figure 1:
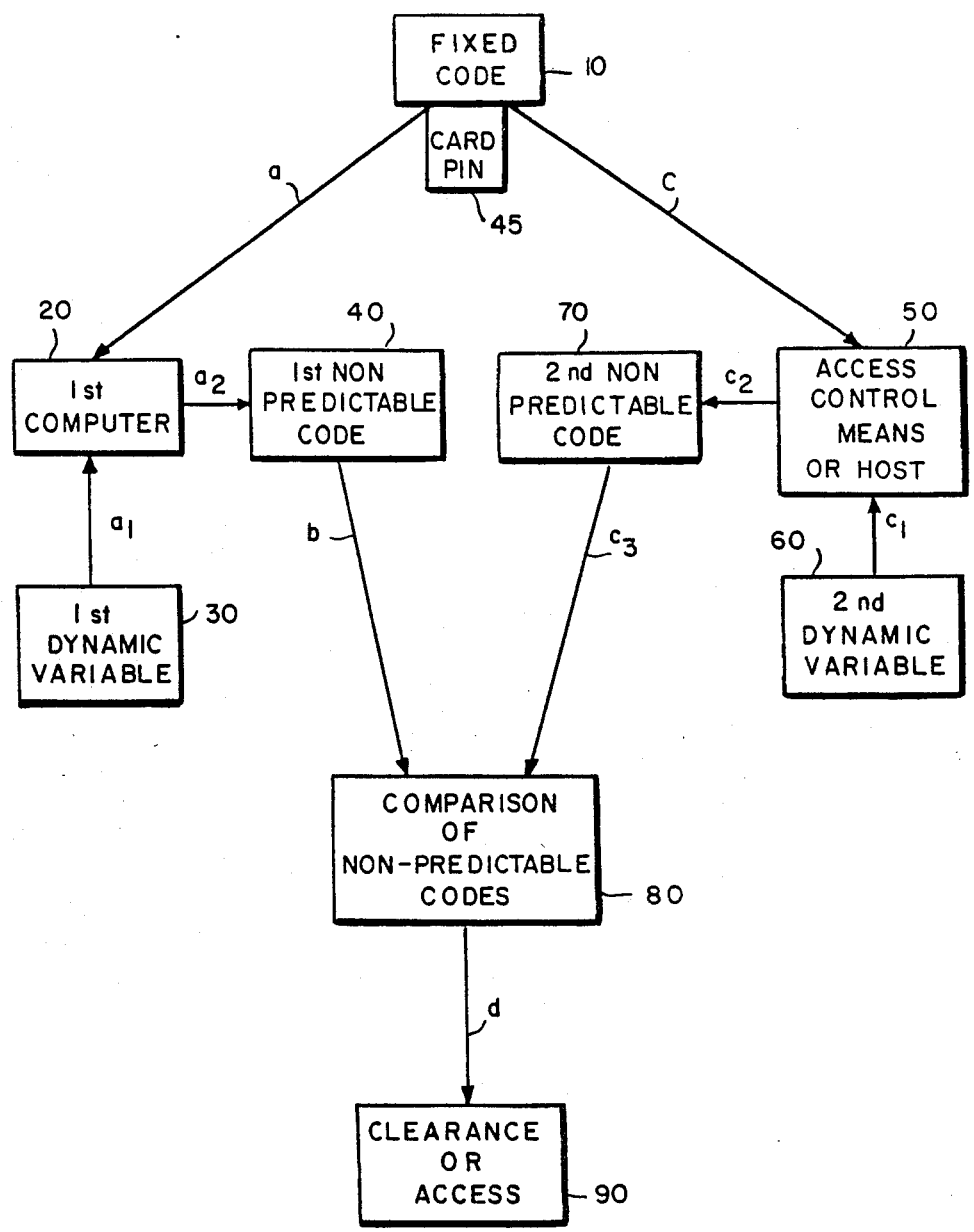
FIG. 1 is a block diagram of a basic apparatus and method according to the invention for generating and comparing non-predictable codes.

The following discussion describes the most preferred embodiments of the invention.

In accordance with the invention an authorized person is provided with a fixed secret code or card seed 10, FIGS. 1, 1A, 2, 3A, typically a number, which is unique to that individual. In the case of a credit or bank/cash card 20, FIG. 2, that number 10 may be printed on the card itself such that if the authorized owner of the card forgets the number, it can be quickly retrieved by reference to the card or other premanently printed form of the fixed code 10. Where the fixed code/card seed 10 is provided in permanent printed form on or in close connection with the apparatus of the invention there is also preferably provided an additional portion of the fixed code 10, a so-called pin 45 (personal identification number), which the authorized user memorizes in order to further guard against misappropriation of the fixed code/card seed 10. The fixed code/card seed 10 or pin 45 may alternatively be used to identify an authorized terminal which has been issued by the authority presiding over the granting of clearance or access.

Figure 1A:
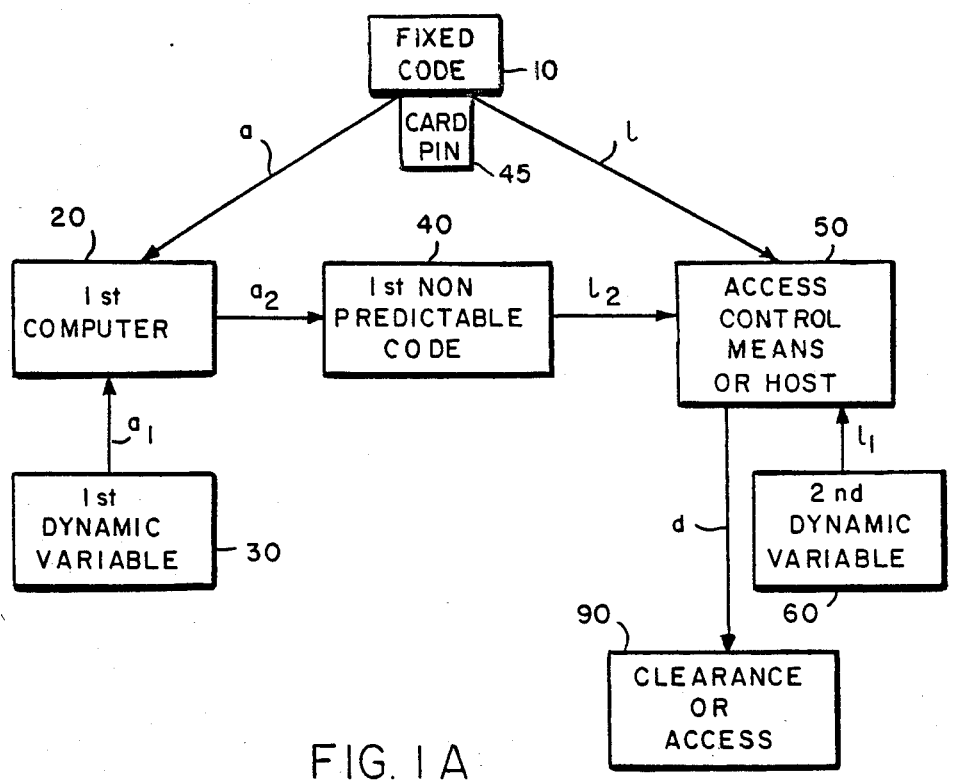
FIG. 1A is a block diagram of a preferred apparatus and method for generating and comparing non-predictable codes where a means for comparing non-predictable codes is included in a calculator which generates a non-predictable code.
Figure 3A:
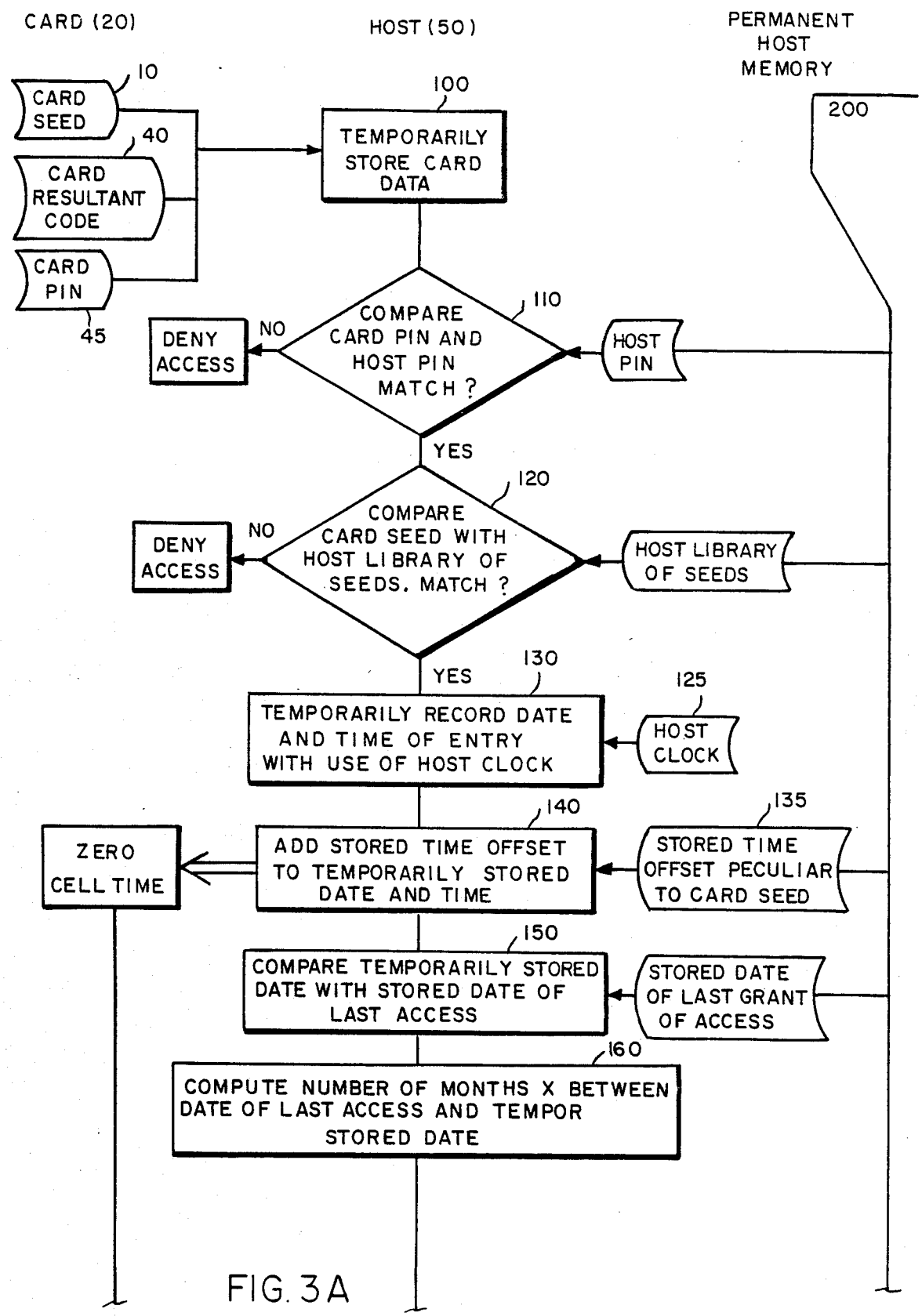
FIGS. 3A and 3B are a flow chart demonstrating a most preferred series of steps carried out by an apparatus according to the invention and/or in a method according to the invention; and, FIGS. 4–9 are diagrammatic representations of series of resultant code cells separately generated by separate computers according to exemplary situations described herein; each diagram sets forth the relationship vis a vis real time between resultant codes generated on the basis of time as kept by separate clock mechanisms in the separate computers generating the resultant codes according to the corresponding exemplary conditions described with reference to each figure.

Such a fixed and/or memorized code (commonly referred to as a pin 45, FIG. 3A or personal identification number) is input into an access control module ("ACM") or host computer 50, FIGS. 1, 1A, 3 together with the unique static variable 10 and temporarily stored within the memory of the host or ACM, step 100, FIG. 3A.

Preferably once the card seed 10 and pin 45 are input into the host or ACM 50, each is separately compared against a library of authorized card pins, step 110, FIG. 3A, and a library of authorized card seeds, step 120, FIG. 3A, stored in the host or ACM memory to determine whether there is a match. If either of the pin 45 or card seed 10 which the user inputs into the host or ACM does not produce a match, clearance or access is denied and the card user must start over in order to gain access or clearance.

Figure 2:
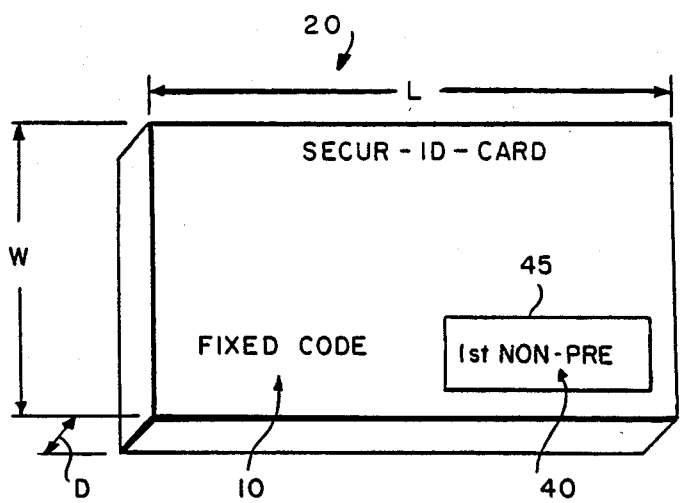
FIG. 2 is a front isometric view of a credit card sized calculator for calculating a first non-predictable code for use in gaining clearance or access according to the invention.

In order to generate a non-predictable code 40, FIGS. 1–3, which will ultimately give the user clearance or access, the fixed code or seed 10 and/or pin 45 must be input into a predetermined algorithm which manipulates the seed 10 and/or pin 45 as a static variable. The algorithm is typically provided to the user in the form of a calculator 20, FIG. 2, which is loaded with a program for carrying out the predetermined algorithm. The calculator 20 preferably comprises an electronic computer and most preferably comprises a microprocessor having a sufficient amount of volatile dynamic memory to store and carry out the functions of the predetermined algorithm. The computer 20 is most preferably provided in a card 20, FIG. 2, having the appearance and approximate size of a credit card.

Such credit card sized computer 20, FIG. 2, also preferably includes a conventional liquid crystal display 44 for displaying the ultimate non-predictable code 40 generated by the algorithm (referred to in FIG. 3A as "card resultant code"). The non-predictable code 40 thus generated may be visually observed by the user for eventual input into a host computer or ACM 50, FIGS. 1, 1A. 3. As shown in FIG. 2, the preferred form of card computer 20 has a length L of about 3.3 inches, a width W of about 2.1 inches and a depth D of less than about 0.07 inches. In addition or as an alternative to providing microprocessor 20 with a liquid crystal display 45 for visual observation of the first non-predictable code 40, computer 20 may include means for machine reading the first non-predictable (or card resultant) code 40 and/or pin 45 to the ACM or host 50, or may include sound producing or other means for personally sensing the first non-predictable code 40.

With reference to FIG. 3A, after the card and host pins are compared and found to match, step 110, the card seed 10 is typically compared against a library of card seeds stored in the host or ACM memory in order to determine whether there is a match, step 120, FIG. 3A. If the card seed 10 input into the host or ACM 50 does not match up with one of the seeds stored in the host library, access or clearance is denied, "no" step 120, FIG. 3A.

For purposes of initial explanation the discussion which follows with reference to FIGS. 1 and 1A assumes an embodiment of the invention whereby a single resultant code 70 is generated by the host or ACM 50. The most preferred embodiment of the invention wherein the clock mechanisms which generate the resultant codes 40 and 70, are synchronized and wherein the host or ACM preferably generates a series of resultant, non-predictable codes, as opposed to a single code 70, is described hereinafter with reference to FIGS. 4–9.

In addition to using the seed 10 and/or pin 45 as static variables the predetermined algorithm is designed to utilize a second variable, a dynamic variable 30, 60, FIGS. 1, 1A, to calculate the non-predictable codes 40, 70 which may ultimately give access or clearance 90 to the user. A dynamic variable may comprise any code, typically a number, which is defined and determined by the interval of time in which the card seed 10 and/or pin 45 is put into the algorithm of either the card computer 20 or the host or ACM 50. A dynamic variable is most preferably defined by the date and the minute in which the static variable is input into the predetermined algorithm. A dynamic variable thus defined can be seen to change every minute. The dynamic variable could alternatively be defined according to any interval of time, e.g., 2 minutes, 5 minutes, 1 hour and the like. A dynamic variable thus defined would alternatively change every 1 minute, 2 minutes, 5 minutes, 1 hour or with the passage of any other predetermined interval of time.

With reference to FIG. 1 the most preferred means of establishing such a dynamic variable is via a time keeping means, such as an electronic digital clock, which by conventional means automatically inputs, steps $a_1$ or $c_1$, the date and specific interval of time (e.g., 1 minute, 2 minutes, 5 minutes, etc.) into the predetermined algorithm of the card 20 or host or ACM 50 in response to the input, step a or c, of the static variable 10 and/or pin 45. The date and time thus generated by the time keeping means may itself be independently manipulated according to another predetermined algorithm prior to input into the first predetermined algorithm of the dynamic variable. The fact that the dynamic variable 30 or 60 being input into the predetermined algorithm constantly changes in absolute value with passage of successive intervals of time of predetermined duration means that the card code 40 or host or ACM code 70 generated according to the predetermined algorithm is also constantly changing with successive intervals of time and is thereby completely non-predictable.

The non-predictability of the codes 40, 70, FIG. 1, generated in the manner described above may be enhanced by the fact that the predetermined algorithm (together with the static variable 10 and/or pin 45 and dynamic variable 30 input thereinto) are preferably stored in the calculator 20 (and/or host or ACM 50) in volatile dynamic electronic memory which is encapsulated with an energizing means which destroys the algorithm, the card seed 10, and the dynamic variable 30 (or 60) when the electronic memory is invaded, interrupted or violated in any way. The predetermined algorithm thus stored in such volatile dynamic memory cannot be discovered by a would-be thief because the entire memory including the predetermined algorithm is destroyed upon invasion of the memory.

In a preferred embodiment of the invention therefor the card seed 10 is stored in such volatile dynamic memory and by conventional means is automatically input step a, FIGS. 1, 1A, into the algorithm of the first computer 20 at regular intervals of time. Such automatic inputting of the card seed 10 may thereby work in conjunction with the automatic definition and inputting of the first dynamic variable 30 into the predetermined algorithm of the first computer 20 to effect completely automatic generation of the first non-predictable or resultant code 40 at regular intervals of time.

The invention most preferably contemplates providing authorized personnel with a card computer 20, FIG. 2, only, but not with knowledge of the predetermined algorithm included in the computer 20. Authorized personnel are, therefore, provided with a computer 20 capable of carrying out an algorithm which is unknown to such authorized personnel.

In the most preferred embodiment of the invention where the predetermined algorithm provided to authorized users is stored in a volatile dynamic memory encapsulated with an energizing means which destroys the algorithm upon invasion of the memory, the only means of gaining unauthorized clearance or access is to misappropriate possession of the original computer 20 itself and knowledge of the fixed code/card seed 10 (and knowledge of the card pin 45 if employed in conjunction with the invention).

The algorithm may alternatively be designed to manipulate more than one fixed code and/or more than one dynamic variable. Several means for inputting each fixed code and dynamic variable may be included in the calculator 20 provided to users and in the host or ACM 50, FIG. 3A. Each dynamic variable is preferably defined by the interval of time in which one or more of the fixed codes/card seeds are input into the algorithm.

It can be seen, therefore, that the predetermined algorithm can comprise any one of an infinite variety of algorithms. The only specific requirement for an algorithm to be suitable for use in the present invention is that such algorithm generate a non-predictable code on the basis of two classes of variables, static variables (the fixed codes) and dynamic variables such as described hereinabove. A non-predictable code C which is ultimately generated by the predetermined algorithm, f (x,y), may be expressed mathematically as:

$$f(x,y)=C$$

where x is a static variable/fixed code and y is a dynamic variable. Where several (n) static variables ($x_1$, $x_2$, ... $x_n$) and several (n) dynamic variable ($y_1$, $y_2$, ... $y_n$) are intended for use in generating non-predictable codes, a non-predictable code thus generated may be expressed mathematically as $f(x_1, x_2, ... x_n, y_1, y_2, ... y_n)=C$.

The specific form of the algorithm only assumes special importance as part of the invention, therefore, when the algorithm is capable of being discovered by would-be unauthorized users. In the most preferred embodiment of the invention where the algorithm is completely undiscoverable by virtue of its storage in a volatile dynamic electronic memory which destroys the algorithm upon attempted invasion of the encapsulated memory, the specific form of the algorithm comprises only an incidental part of the invention. The mere fact of the use of some algorithm to manipulate the fixed code and the dynamic variable does, however, comprise a necessary part of the invention insofar as such an algorithm generates the ultimately important non-predictable code.

As the term "fixed code" or "card seed" or "seed" is used herein such terms include within their meaning numbers, codes, or the like which are themselves manipulated or changed, mathematically or otherwise, in some non-dynamic manner prior to or during the generation of a second non-predictable code 40, FIG. 3A. The first 20 or second computer 50 may, for example, be provided with a static program/algorithm utilizing the fixed code or seed as a variable and generating a new fixed code or seed which is ultimately input as the fixed code or seed 10 variable in the secret algorithm which generates the non-predictable codes. For example, for purposes of added security, a fixed code or seed 10 may be first added to another number and the result thereof used as the fixed code or seed 10 used to generate the non-predictable codes. Thus, the term fixed code or seed includes within its meaning the result of any non-dynamic operation performed on any fixed code or seed. It can be seen, therefore, that essentially any algorithm or operation may be performed on the fixed code 10 to generate another fixed code or seed, the algorithm or operation most preferably comprising a static algorithm or operation, i.e., one not utilizing dynamic variables so as to generate a static result.

With reference to FIG. 1, after a first non-predictable code 40 is generated as described above, such first non-predictable code 40 is compared 80 with the "second" non-predictable code 70 which is also generated by the user by putting, step c, the fixed code/card seed 10 (and the pin 45, if employed) into the host or ACM 50 which contains the same predetermined algorithm used to generate the first non-predictable code 40.

With reference to FIG. 1A, (a schematic diagram which assumes the host or ACM 50 includes the predetermined algorithm and the mechanism for comparing and matching the non-predictable codes) the first non-predictable code 40 is put, step $e_2$, into the host or ACM 50 essentially immediately after the fixed secret code 10 is put into the host or ACM 50 (i.e., step $e_2$ is carried out essentially immediately after step e) in order to gain clearance or access 90. If steps e and $e_2$ are not carried out within the same interval of time as steps a and $a_1$, were carried out, (i.e., the same interval of time on which code 40 is based), then the host or ACM will not generate a second dynamic variable 60 which will allow the predetermined algorithm of the host or ACM 50 to generate a second non-predictable code which matches the 1st non-predictable code 40.

Figure 3B:
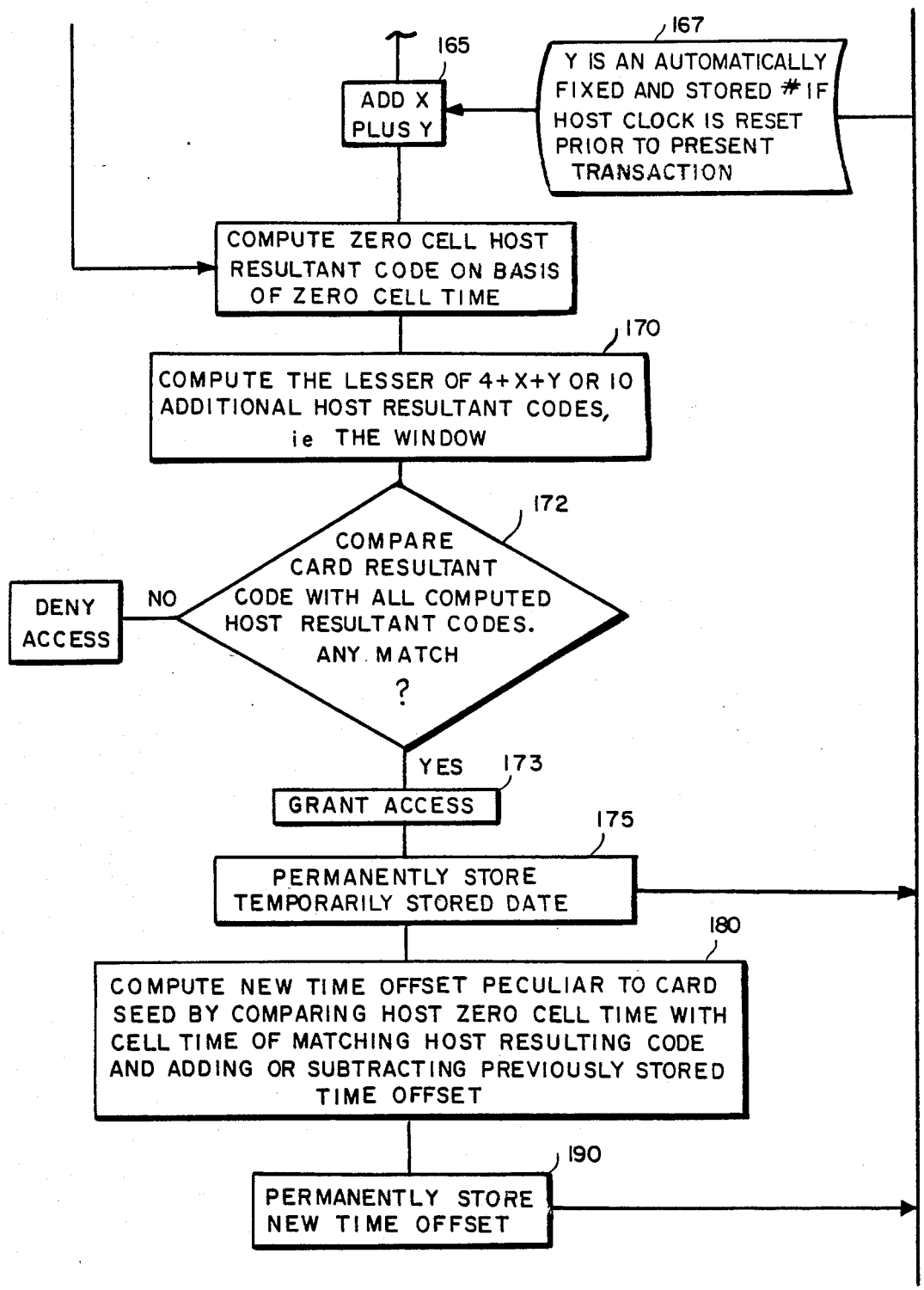
Figure 4:
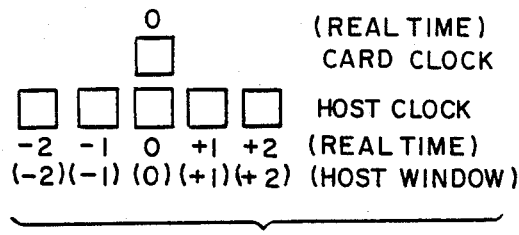

The necessity for carrying out steps e and $e_2$, FIG. 1A, within the same minute or other selected interval of time ("cell") is obviated in a most preferred embodiment of the invention. With reference to FIGS. 3-4, the card 20 generates a resultant code 40, on the basis of a cell of time in which the code 40 was generated as defined by the card clock. Assuming for the sake of explanation that the card clock and the host or ACM clock 125 are synchronized with each other and with real time and assuming the user inputs the correct card seed 10 and resultant code 40 into the host or ACM 50 within the same cell of time as the resultant code 40 was generated by the card 20 the host 50 is preferably provided with a program which generates a series or "window" of resultant codes (as opposed to a single non-predictable code 70, FIG. 1). [As used hereinafter, the term "cell" is, depending on the context, intended to refer to an interval of time of predetermined duration on which the generation of a resultant code is based or to the resultant code itself.] The various second non-predictable codes which comprise the "window" are calculated by the host or ACM 50 on the basis of the cell of time in which the user correctly entered the seed 10, code 40, and pin 45 into the host or ACM 50 as defined by the host clock 125, FIG. 3A, and one or more bordering cells of time, e.g., $-2$, $-1$, and $+1$, $+2$ as shown in FIG. 4. An ACM or host computer 50 program then compares the card resultant code 40 with all of the individual resultant codes computed as the window of host cells shown in FIG. 4 to determine whether there is a match between any of the host cells and the card code 40. In the example stated, the card code 40 will of course match up, step 172, FIG. 3B, with the zero cell based host code, FIG. 4 because the user input the seed 10, pin 45 and code 40 within the same cell of time as the card code 40 was generated.

[As used hereinafter, "input" or "inputting" or "entry" into the host or ACM 50 refers to input of the correct card seed 10, card resultant code 40 and card pin 45 into the host or ACM 50 and positive matching of the card seed 10, step 120, FIG. 3A, and card pin 45, step 110, with a host seed and host pin which are stored in the permanent memory in the host or ACM 50].

Figure 5:
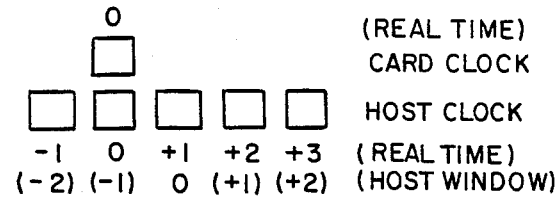

Assuming in the example stated above with reference to FIG. 4, however, that the user had input the card code 40 and seed 10 (and pin 45), FIG. 3A, one minute later than the card had generated the code 40, the host or ACM 50 will have generated a different window of codes as shown in FIG. 5; that is, the host will have generated a central cell corresponding to a $+1$ cell code (based on real time) as if the $+1$ cell code is the zero cell of the window of cell (as shown in parenthesis in FIG. 5) and further generate the predetermined number of bordering cell codes (e.g., real time $-1$, 0 and $+2$, $+3$ as shown in FIG. 5). Thus although the user inputs the card seed 10 and the card resultant code 40 into the host or ACM 50 one minute late, the host computer 50 still generates a matching cell code, the real time zero cell code which "borders" the central cell, i.e., the $+1$ central cell code as shown in parenthesis in, FIG. 5.

Provision of the host or ACM 50, FIGS. 3A, 3B-5 with a mechanism for generating a series or window of second non-predictable codes, as opposed to a single second code 70, FIG. 1, thereby allows a card user a selected amount of leeway of time (beyond the time length of the interval of time on which code 40 is based) in which to input a correct seed 10, pin 45 and card code 40 into the host or ACM 50 and still generate a matching host resultant code.

The examples stated above assumed that the card clock and the host clock 125, FIG. 3A, were both synchronized with real time. Assuming the card clock and the host clock remain synchronized at all times, it would only be necessary to provide the host or ACM 50 with a mechanism for generating a selected number of bordering cells which "precede" the central cell of the window, e.g., with reference to FIG. 5, the $(-2)$, $(-1)$, (0) cells In those applications where the card clock and the host clock are maintained in synchrony with each other at all times, the host or ACM clock 125 preferably defines only two dynamic time variables so as to generate a central cell code and a $-1$ host window cell code. Such embodiment allows the user to input to seed 10, pin 45 and code 40 one cell code late but only one cell code late for security enhancement.

In the more typical case, however, where the card clock and the host clock 125 may be out of synchrony with real time, e.g., where the card clock is running fast relative to the host clock, the generation of cells which "follow" the central cell of the host window may be required to generate a matching host resultant code.

Figure 6:
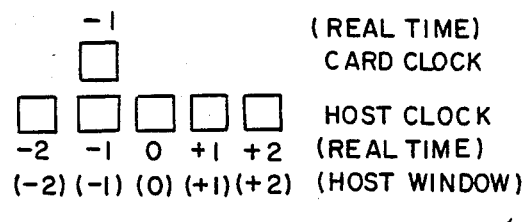

With reference to FIGS. 3A, 3B, 6 the invention most preferably provides a mechanism for synchronizing the card and host clocks in the case where such independent clocks more typically run fast or slow relative to real time and/or relative to each other.

The following examples assume for purposes of explanation that the time equivalent length of all cell codes are one minute in duration. Assuming that the card clock is one minute slow and the host clock 125, FIG. 3A is correct relative to real time, the card will generate a resultant code 40 based on a real time of $-1$ minute (relative to the host clock 125) and, if the user inputs the card resultant code 40 (and the correct seed 10 and pin 45) into the host or ACM 50 within the same minute as the code 40 is generated, the host or ACM 50 will generate a window of resultant codes according to the series of cells shown in FIG. 6 (assuming the predetermined number of bordering cells is selected as 2 cells immediately preceding and 2 cells immediately following). Matching resultant codes, i.e., the card $-1$ code and the host $-1$ cell code, will thus have been generated.

Although the card clock was one minute slow in the example just described, the host computer is provided with a program mechanism which will automatically adjust (i.e., synchronize) the host clock time with the card clock time when the card user next enters a correct card seed 10 and card pin 45 (and code 40) into the host or ACM 50. The host accomplishes such synchronization by storing a difference in matching cell time in the permanent memory of the host, step 190, FIG. 3B; e.g., in the example just described, the last matching transaction, step 180, FIG. 3B fell in the $-1$ cell of the host "window" as shown in parenthesis in FIG. 6. Such cell time difference is referred to herein as the "time offset" which is stored in the permanent host memory, step 190, FIG. 3B. The time offset is the difference in time between the central cell and the bordering cell from which a matching second non-predictable code was generated.

Figure 7:
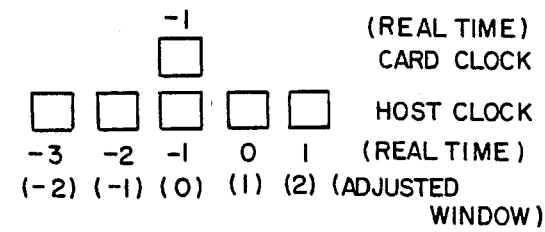

Upon the next entry of the card user into the host 50 (assuming the card clock has not run any slower since the last entry and assuming the host clock has remained synchronized with real time and assuming the user next enters the host 50 within the same minute as the card generates resultant code 40), the host computer 50 will automatically algebraically add the store time offset, steps 135, 140, FIG. 3A, to the temporarily stored host clock time, step 130, and generate the series of relative real time host cell codes shown in FIG. 7 wherein the card code cell which is one minute slow in real time, is now treated in the host window as a zero cell (as shown in parenthesis in FIG. 7), i.e., the central cell of the host window of cells, is adjusted to subtract one minute therefrom, via subtraction of the one-minute stored time offset 135, FIG. 3A. As shown in FIG. 7, the bordering cells of the host window are similarly adjusted by the one-minute stored time offset. Further, in all future entries by the user into the host 50, the temporarily stored time and date of entry, step 130, FIG. 3A, will be adjusted by the permanently recorded one-minute stored time offset.

As to the example described above with reference to FIG. 5 wherein the card and host clocks were assumed to be synchronized with real time and wherein the user entered the host one minute late, it is noted that even though the host clock was synchronized with real time, the host will nevertheless compute a time offset, step 180, FIG. 3B, to be stored, step 190, and used in adjusting the temporarily stored time of entry, step 130, FIG. 3A, in future transactions by the user, because the matching cell of the host window, as shown in parenthesis FIG. 5, was not the central cell code of the window (i.e., was not the real time +1 cell code) but rather was a bordering real time cell code, i.e., the bordering real time zero cell code.

Simply stated, therefore, a stored time offset will be computed step 180, FIG. 3B, and stored, step 190, FIG. 3, for use in adjusting the time of entry into the host in all future entries, step 140, FIG. 3A, whenever on a given entry, step 130, FIG., 3, a "bordering" cell code of the host window (as opposed to the central cell code) produces a match with the input card resultant code 40.

In storing, step 190, FIG. 3B, a time offset which is computed, step 180, during any given transaction, the presently computed time offset is algebraically added or summed to any time offsets previously computed and stored as a result of previous entries and grantings of access, step 173.

Inasmuch as a clock mechanism, once beginning to run fast or slow, will continue to run fast or slow during all future uses of the system of the invention, the host or ACM 50 will add or subtract all time offsets recorded during successive uses of the system to the stored time offset(s) recorded and permanently stored from previous transactions, step 180, FIG. 3B. Most preferably, a newly computed time offset will not be permanently stored, step 190, in the host or ACM memory 200, unless and until access or clearance has already been granted, step 173.

As described and shown in the examples of FIGS. 4–7 the host or ACM is typically programmed to compute four (4) cell codes bordering the central cell code (i.e., two cells immediately preceding and two cells immediately following the central cell) as the "window" within which the user is allowed to deviate in inputting the card seed 10, the pin 45, and, the card resultant code 40 into the host or ACM. Such bordering cells have been described as corresponding to codes corresponding to one-minute intervals. It is noted that the number and time equivalent length of the bordering cells may be increased or decreased as desired.

Figure 8:
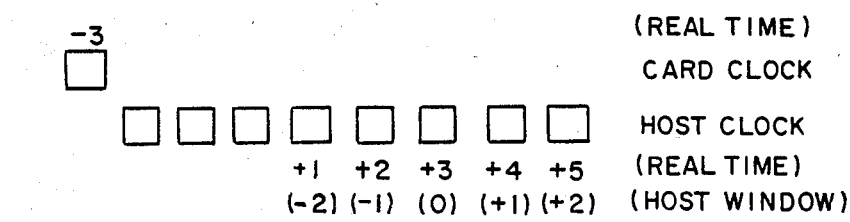

The absolute degree by which the card clock and the host or ACM clock 125 may run fast or slow relative to real time typically increases with the passage of time. For example, if the card clock is running slow by 30 seconds per month and the host clock is running fast at 30 seconds per month, the two clocks will run the time equivalent of one minute out of synchrony after one month, two minutes out of synchrony after two months, three minutes out of synchrony after three months, etc. If the authorized card user uses the card each month, the automatic synchronizing means described above with reference to FIGS. 4–7 will have adjusted the host or ACM time window upon each usage to account for such lack of synchrony with real time. If, however, the card user does not actually use the card for, for example, six months, the card clock and the host clock will be six minutes out of synchrony, and even if the user correctly uses the system by inputting the pin 45, card seed 10 and card code 40, FIG. 3A, into the host or ACM within the same minute (or other selected time cell interval) as the pin 45, the seed 10 and code 40 were generated by the card, the user would not be able to gain access or clearance (i.e., cause the host or ACM to generate a matching resultant code) in the typical situation where the "window" of bordering cell times is selected as two one-minute cells immediately preceding and two one-minute cells immediately following the central host cell. FIG. 8 depicts such an exemplary situation as just described, wherein it can be seen that the card clock, after six months of non-usage, generates a resultant code 40, FIG. 3, which is based on −3 minutes in real time, and the host clock, after six months of non-usage, causes the generation of the typically selected five cell window comprising cell codes corresponding to +1, +2, +3, +4, and +5 minutes in relative real time. In the typical case, therefore, where the selected window comprises four bordering cells, matching second non-predictable codes will not be generated under any circumstances after six months of non-use.

The invention most preferably provides a mechanism by which the host window of bordering cells is opened wider than the preselected window by an amount which varies with the length of time of non-use of the card. Such window opening is accomplished by storing the most recent date of comparison and matching, determining the difference in time between such date and the present date of entry into the second computer and calculating as many additional bordering cells as may be predetermined according to the difference in time between the dates.

Typically the window is opened by two one minute bordering cells per month of non-use (e.g., one cell immediately preceding and one cell immediately following the preselected window) but the number of cells by which the window is opened and the time equivalent length of each cell may be predetermined to comprise any other desired number and length.

Figure 9:
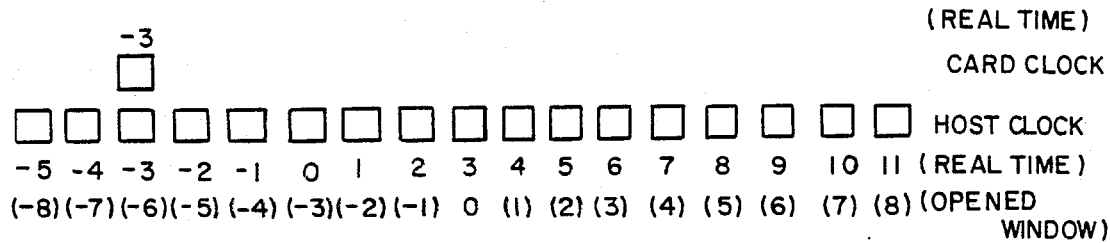

Assuming the exemplary situation described above where the card clock and the host clock 125, FIG. 3A, are running slow and fast respectively by 30 seconds per month and the user has not used the card for six months, the host or ACM compares, step 150, the temporarily stored date of the present entry, step 130, with the permanently stored date of the last access, step 175, and computes the number of months X, step 160, between the date of last access and the date of present entry. In the present example six months of non-use is calculated step 160, FIG. 3A, and the window is opened by six additional one-minute bordering cells on either side of the preselected four cell window as shown in FIG. 9 to give an overall window of sixteen minutes. The card resultant code 40 based on −3 minutes in relative real time thus matches, step 172, FIG. 3A, as shown in FIG. 9 with the −6 host bordering cell code (−3 in real time) and access or clearance is ultimately granted. As described above with reference to FIGS. 4–7, because the matching host cell code is a bordering cell code of the host window and not the central host cell (i.e., the zero cell), a new stored time offset of −6 minutes will be computed (i.e., added to the permanently stored time offset), step 180, FIG. 3B, and stored, step 190, and the host clock thereafter will adjust the zero cell of the host window (and accompanying bordering cells) each time the user of the card having the particular card seed 10 and pin 45 which was used in the present transaction uses the card to gain access in future transactions.

Lastly the invention further includes a failsafe window opening mechanism to provide for the contingency where the host or ACM 50 and its clock 125, FIG. 3A, may shut down between card usages. In the event of such a shut down, the host or ACM clock 125 must typically be reset and re-synchronized, and in the course of such re-setting an error may be made in the resynchronization. In order to insure that the card user may reasonably gain access in the event of such an error in re-setting the host clock 125, the host or ACM 50 is preferably provided with a mechanism for sensing such a re-setting and for storing a predetermined window opening number upon each re-setting of the host or ACM 125. Such window opening number is typically selected as six additional one-minute bordering cells(e.g., three additional cells immediately preceding and three additional cells immediately following the existing window) but may be selected as more or fewer cells of other selected length.

The re-setting window opening number is typically added, step 165, FIG. 3B, to the result of non-usage step 160 and the total additional number of cells comprising the window is computed, step 170, FIG. 3B. i.e., all bordering cells surrounding the central cell are computed including (a) the preselected window allowing for user delay in inputting and/or card and host clock asynchrony, (b) the non-usage window allowing for card and host clock asynchrony over long periods of time of non-usage and (c) the re-setting window opening number.

Assuming the exemplary situation described above with reference to FIG. 9, if the host or ACM had shut down within the six month period of non-use, the host window as depicted in FIG. 9 would be further opened by an additional six bordering cells such that −11, −10, −9 and +9, +10, +11 host window cells would also have been computed, step 170, FIG. 3B, and made available for comparison and potential matching with card resultant code 40 in step 172, FIG. 3B. As described with reference to FIGS. 5–9, where a new time offset is computed and stored, steps 180, 190, FIG. 3B, as a result of a match found in a bordering cell of a window generated by virtue of non-usage and/or the preselected window, a new time offset will similarly be computed and stored, steps 180, 190, if a match is found in a bordering cell generated as a result of shutdown.

Unlike the non-usage window opening number, the re-set window opening number is typically stored in the permanent memory 200 of the host or ACM 50, FIG. 3A, such that once the host clock 125 is re-set, the selected window opening number is available in permanent memory 200 to open the window upon the next attempted entry by the user. Although the re-set window opening number is established and stored in permanent memory 200, such re-set window opening number is preferably eventually closed down or eliminated for security enhancement after it is established upon successive attempted entries by a variety of card users that the host clock 125 was correctly reset or after the host clock 125 is otherwise re-synchronized with real time to correct any errors which may have occurred as a result of the re-setting. The use of the re-set window opening number is, therefore, preferably temporary.

In the practical application of the invention, many cards are issued to many users and each card includes its own card clock. Recognizing that the average of the times being kept by the individual clocks of a statistically significant sample of a variety of cards, will produce an accurate or very nearly accurate representation of real time, the invention most preferably includes a mechanism for permanently adjusting the time kept by the host clock 125, FIG. 3A, after the clock 125 has been re-set, to the average of the times of entry (after re-setting of the host clock 125) of a selected number of different cards or card users. For example, assuming that host clock 125 has been reset, the next time of entry of the next five (or other selected number of) separate card users is averaged, the host clock 125 is permanently adjusted or re-synchronized to such an average time, and the re-set window opening number is thereafter eliminated from the permanent host memory 200. Re-adjusting or re-synchronization of the host clock 125 to the averaged time of the card clocks is typically carried out by the host 50 by computing another master time offset which is algebraically added to the time offsets peculiar to each card 20. The computation of such a master offset assumes that a selected number of separate cards 20 were able to gain access, step 173, FIG. 3B as a result of the re-set window opening or otherwise. The average of the time offsets computed as to the selected number of cards which enter the host 50 (after the host clock 125 is re-set) is preferably stored as a master time offset (i.e., as a re-synchronization of the host clock 125), the re-set window opening number is then eliminated as to all future entries by card users, and the master time offset is used (in addition to permanently stored time offsets peculiar to each card) to adjust the card clock 125 in transactions as to all card entries thereafter.

As a practical matter, a limit is typically placed on the total number of bordering cells by which the window is opened regardless of the length of time of non-usage by the card user or the number of times the host or ACM 50 is reset as a result of re-setting of clock 125. For security reasons, such a limit is typically selected as ten one-minute bordering cells - as stated in step 170, FIG. 3B the number of codes comprising the windown are the lesser of (a) 4 bordering cell codes, the preferred selected window, plus X, the number of months or other selected non-usage periods, plus Y, the shut down window opening number, or (b) 10, the maximum number of additional cell codes. Such a maximum window may, of course, be selected as more or less than 10 depending on the degree of security desired.

It is noted that FIGS. 3A, 3B depicts a preferred sequence of operations and not necessarily the only sequence. Steps 110 and 120 could, for example, be interchanged or, for example, the step of automatically inputting the re-set window opening number, step 167 could precede any of steps 140–160.

The host or ACM 50, FIGS. 1, 1A, 3A, 3B, typically includes one or more programs and sufficient memory to carry out all of the steps shown in FIGS. 3A, 3B, although one or more of those functions may be carried out by a device separate from and communicating with or connected to the host or ACM 50.

With respect to the computation, storage and retrieval of time offsets, the host or ACM 50 is provided with mechanisms for recognizing, storing, retrieving and computing time offsets which are peculiar to each card seed 10 and/or pin 45 and responsive to the input of the same into the host or ACM 50.

FIG. 2 depicts the most preferred form of the calculator 20 which is provided to authorized users for generating the first non-predictable or card resultant code 40. As shown in FIG. 2 the calcultor 20 is of substantially the same size as a conventional credit card and includes a conventional liquid crystal display 44 for displaying the code 40 to the user. The credit/card computer 20, FIG. 2, may bear the identity of the card seed/fixed code 10 printed on its face, and includes a digital clock means, an energizing means, a microprocessor and sufficient memory for storing the predetermined secret algorithm, a program for generating a dynamic variable if desired, and the card seed 10 and pin 45 if desired.

In an embodiment of the invention where the goal is to grant access to a physical facility, the ACM 50 may comprise a portable device such that it may be carried by a security guard stationed at a central access location leading to a guarded building or other facility. A security guard thus in possession of such an ACM would typically read the card seed 10 and the non-predictable code 40 appearing on the card 20, FIG. 2, of authorized person and input such codes 10, 40 (in addition to the pin 45 - otherwise provided to the guard by the card bearer) into the portable ACM 50 to determine whether the card bearer is truly in possession of a card 20 which was issued by the authority establishing the secret predetermined algorithm.

As described herein protection of the secrecy of the predetermined algorithm is preferably accomplished in the calculators provided to authorized personnel by virtue of its storage in volatile dynamic memory and encapsulation with a volatile dynamic energizing means. With respect to the algorithm provided in the ACM secrecy may be maintained in a similar manner or other conventional manner, e.g., by physically guarding the ACM or requiring additional access/user codes to gain direct access. Where all programs, data and results of operation are stored in such volatile dynamic memory, the same are similarly protected against invasion.

Although the invention contemplates some form of communication of the result of operation 40 carried out on the card 20, FIG. 2, to the host or ACM 50 or any other electronic device, a talking between the computer 20 and the host 50 is not required or contemplated by the invention. Therefore, after the first computer 20 has calculated the first non-predictable code 40 and the code 40 has been input into the host 50, no other information need be communicated back to the first computer 20 from the host 50 or another device in order to gain clearance or access.

Lastly it is noted that the fixed code or seed 10 and/or pin 45, FIGS. 3A, 3B, may be employed to identify a computer terminal or other piece of equipment or device as opposed to a card 20. For example, a terminal or a space satellite or other device may be provided with a computer 20 which is assigned a code or seed 10 and/or a pin 45 (and, of course, provided with the secret predetermined algorithm and a clock and conventional electronic mechanisms for computing the code 40 and inputting the code 10, pin 45, and resultant code 40 to the host or ACM 50) in order to identify such terminal, satellite or the like in the same manner as a card computer 20 is identifiable as dscribed hereinabove.

It will not be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. In a system for comparing and matching non-predictable codes generated by separate computers on the basis of dynamic variables defined by separate first and second clock means according to time, an apparatus for effectively synchronizing the first and second clock means comprising:

a first computer for calculating a first non-predictable code according to a predetermined algorithm, the algorithm generating the first non-predictable code on the basis of a first dynamic variable and a unique static variable;

said first clock means automatically defining the first dynamic variable according to a first interval of time in which the static variable is input into the algorithm, the first interval of time having a first predetermined duration;

a second computer for calculating two or more second non-predictable codes according to the predetermined algorithm, the algorithm generating the second non-predictable codes on the basis of two or more second dynamic variables and the unique static variable;

said second clock means automatically defining the two or more second dynamic variables according to two or more time cells for which the static variable is input into the algorithm of the second computer, the time cells comprising a central cell of time having a predetermined duration and one or more cells of time bordering the central cell of time, each bordering cell of time having a predetermined duration;

means for comparing the first non-predictable code with the second non-predictable codes to determine a match; and means for automatically synchronizing the first clock means and the second clock means upon comparison and matching of the first non-predictable code with one of the second non-predictable codes.

2. The system of claim 1 wherein the central cell of time comprises the date and the minute in which the unique static variable is input into the second computer as defined by the second clock means.

3. The system of claim 2 wherein the bordering cells of time comprise a cell of time comprising the date and the minute immediately preceding the central cell.

4. The system of claim 1 wherein the means for synchronizing comprises:

counting means for counting the difference in time between a central cell of time and a bordering cell of time from which a matching second non-predictable code may be generated;

summing means connected to the counting means for summing successive differences in time counted by the counting means;

storage means connected to the summing means for storing the output of the summing means; and, shifting means connected to the storage means for shifting a central cell and bordering cells of time by the summed times stored in the storage means.

5. The system of claim 4 wherein the bordering cells of time comprise a selected number of cells of time immediately preceding the central cell and a selected number of cells of time immediately following the central cell.

6. The system of claim 5 wherein the central and bordering cells of time are selected to be one minute in duration.

7. The system of claim 5 wherein the means for synchronizing further comprises:

second storage means connected to the comparison means for storing the date of the most recent comparison and matching by the comparison means;

second counting means connected to the second storage means for counting the difference in time between the date stored and the date of present entry into the second computer;

dividing means connected to the second counting means for dividing the difference in time counted by the second counting means by a selected value and prescribing the output as a first window opening number;

window opening means connected to the dividing means and the comparison means for calculating as many extra second non-predictable codes on the basis of as many extra bordering cells of time immediately preceding and following the selected number of bordering cells as prescribed by the first window opening number.

8. The system of claim 7 wherein the means for synchronizing further comprises:

sensing means connected to the second clock means for sensing a re-setting of the second clock means;

third storagae means connected to the sensing means for prescribing and storing the occurrence of a sensed re-setting of the second clock means as a selected second window opening number; and second window opening means connected to the third storage means for calculating as many additional second non-predictable codes on the basis of as many additional bordering cells of time immediately preceding and following the extra bordering cells of time as prescribed by the second window opening number.

9. The system of claim 8 wherein the first computer comprises a microprocessor wherein the algorithm is stored in volatile dynamic memory encapsulated with an energizing means which when interrupted destroys all data including at least the algorithm and the static variable.

10. The system of claim 9 wherein the first computer and the first clock means are incorporated into a card of about the same size as a credit card.

11. The system of claim 10 wherein the algorithm of the second computer is stored in volatile dynamic memory encapsulated with an energizing means which when interrupted destroys all data including at least the algorithm and the static variable.

12. In a method for comparing non-predictable codes generated by separate computers on the basis of dynamic variables defined by separate clock means according to time wherein the codes match when the dynamic variables match, a method for effectively synchronizing the separate clock means comprising the steps of:

inputting the static variable into a first computer including a predetermined algorithm;

employing the algorithm of the first computer to calculate a first non-predictable code on the basis of the static variable and a first dynamic variable defined by a first interval of time in which the step of inputting occurred according to a first clock means;

putting the static variable and the first non-predictable code into a second computer, the second computer independently including the predetermined algorithm;

using the algorithm of the second computer to independently calculate two or more second non-predictable codes on the basis of the static variable and two or more second dynamic variables defined by two or more cells of time in which the step of inputting occurs according to a second clock means, the cells of time comprising a central cell of time and one or more bordering cells of time;

comparing the first non-predictable code with the second non-predictable codes to determine a match; and synchronizing the first clock means and the second clock means upon comparison and matching of the first non-predictable code with one of the second non-predictable codes.

13. The method according to claim 12 wherein the step of synchronizing comprises the steps of:

counting the difference in time between a central cell of time and a bordering cell of time from which a matching second non-predictable code may be generated;

summing successive differences in time counted during the step of counting;

storing the summed successive differences in time; and, shifting the central and bordering cells of time by the summed successive differences in time.

14. The method according to claim 13 wherein the step of synchronizing further comprises the steps of:

storing the date of the most recent comparison and determination of a match;

counting the difference in time between the date stored and the date of present entry into the second computer;

dividing the difference counted during the step of counting the difference in dates by a selected value and prescribing the output as a first window opening number; and, calculating as many extra second non-predictable codes on the basis of as many extra bordering cells of time immediately preceding and following the selected number of bordering cells as prescribed by the first window opening number.

15. The method according to claim 13 wherein the step of synchronizing further comprises the steps of:

sensing a re-setting of the second clock means;

prescribing and storing the occurrence of a sensed re-setting of the second clock means as a second selected window opening number; and, calculating as many additional second non-predictable codes on the basis of as many additional bordering cells of time immediately preceding and following the extra bordering cells of time as prescribed by the second window opening number.

16. The method of claim 12 wherein the central and bordering cells of time are selected to be one minute in duration.

17. In an identification system utilizing a first computer means to generate a first non-predictable code sequence as a function of a first time dependent variable in accordance with a predetermined algorithm, a first clock means for generating a sequence of said first time dependent variables during successive time cells, each of which cells is of a predetermined time interval, means for applying the output of said first clock means to said first computer means, a second computer means to generate a second non-predictable code sequence as a function of a second time dependent variable in accordance with said predetermined algorithm, a second clock means for generating a sequence of said second time dependent variables during successive time cells, means for applying the output of said second clock means to said second computer means and means for comparing the first and second non-predictable codes at a selected time cell; a means forming part of said second computer means to compensate for loss of synchronism between the first and second clock means comprising:
  means for computing the second non-predictable code for at least one additional time cell bordering said selected time cell;
  first storing means for storing the second non-predictable codes computed during said selected time cell and during each of said at least one additional time cells;
  wherein said means for comparing includes means for comparing the first non-predictable code for said selected time cell with each of the second non-predictable codes stored in said first storing means; and
  means for establishing identification if the first non-predictable code matches any of the second non-predictable codes.

18. A means to compensate as claimed in claim 17 including means for determining the number of time cells between the time cell for the second non-predictable code which matches the first non-predictable code and said selected time cell;
  summing means for summing successively determined numbers of time cells;
  second storing means for storing the output of the summing means; and
  means responsive to the summed number stored in said means for summing for shifting the time cells for which said second non-predictable codes are generated for storing in said first storing means.

19. A means to compensate as claimed in claim 18 wherein said first storing means normally stores the second non-predictable codes for said selected time cell, for a selected number of time cells immediately preceding said selected time cell and for a selected number of time cell immediately following said selected time cell; and
  wherein said means for shifting shifts the time cell for which each of the stored second non-predictable codes are determined by the value of the summed number stored in said means for summing.

20. A means to compensate as claimed in claim 19 including means for storing the date of the last successful comparison by said means for comparing;
  means for determining the time between the current date and the stored date of last successful comparison;
  means for dividing the time determined by said means for determining by a selected value and designating the output as a first window opening number; and
  first window opening means for utilizing said first window opening number to determine a number of extra second non-predictable codes to be determined and stored in said first storing means for time cells immediately preceding and following time intervals for the codes otherwise stored therein.

21. A means to compensate as claimed in claim 19 including means for sensing a resetting of the second clock means;
  means responsive to the sensing of a resetting of the second clock means for storing a selected second window opening number; and
  second window opening means for utilizing the second window opening number to determine the number of extra second non-predictable codes to be determined and stored in said first storing means for time cells immediately preceding and following the time intervals for the codes otherwise stored therein.

22. In a method for effecting identification which involves the steps of generating a first non-predictable code sequence as a function of a first time dependent variable in accordance with a predetermined algorithm by use of a first computer means, utilizing a first clock means to generate a sequence of said first time dependent variables during successive time cells, each of which cells is of a predetermined time interval, applying the output of the first clock means to the first computer means, utilizing a second computer means to generate a second non-predictable code sequence as a function of a second time dependent variable in accordance with said predetermined algorithm, utilizing a second clock means to generate a sequence of said second time dependent variables during seuccessive time cells applying the output of the second clock means to the second computer means and comparing the first and second non-predictable codes at a selected time cell, a method for utilizing the second computer means to compensate for loss of synchronism between the first and second clock means, comprising the steps of:
  computing the second non-predictable code for at least one additional time cell bordering said selected time cell;
  storing the second non-predictable codes computed for said selected time cell and for each of said at least one additional time cells;
  comparing the first non-predictable code for said selected time cell with each of the stored second non-predictable codes; and
  establishing identification if the first non-predictable code matches any of the stored second non-predictable codes.

23. A method for compensating as claimed in claim 22 including the steps of determining the number of time cells between the time cell for the second non-predictable code which matches the first non-predictable code and said selected time cell;
  summing successively determined numbers of time cells;
  storing the summed number of time cells; and
  shifting the time cells for which said second non-predictable codes are generated for storing and comparison with said first non-predictable code by a value dependent on the summed number of time intervals.

24. A method for compensating as claimed in claim 23, wherein the second non-predictable codes stored are for the selected time cell, a selected number of time cells immediately preceding said selected time cell and a selected number of time cells immediately following said selected time cell; and wherein during said shifting step, the time cell for which each of the stored second non-predictable codes is determined is shifted by the value of the number of time cells determined during said summing step.

25. A method for compensating as claimed in claim 24 including the steps of storing the date of the last successful comparison during said comparing step;

determining the time between the current date and the stored date of last successful comparison;

dividing the time determined during said determining step by a selected value and designating the output as a first window opening number; and utilizing said first window opening number to determine a number of extra second non-predictable codes to be determined and stored for time cells immediately preceding and following the time cells for the codes otherwise stored for comparison with said first non-predictable code.

26. A method for compensating as claimed in claim 24 including the steps of sensing a resetting of the second clock means;

storing a selected second window opening number in response to the sensing of a resetting of the second clock means; and utilizing the second window opening number to determine a number of extra second non-predictable codes to be determined and stored for time cells immediately preceding and following the time cells for the codes otherwise stored for comparison with the first non-predictable code.

* * * * *